US006692565B2

(12) United States Patent
Johansen, Jr. et al.

(10) Patent No.: US 6,692,565 B2
(45) Date of Patent: Feb. 17, 2004

(54) COLORED CEMENT

(75) Inventors: Charles J. Johansen, Jr., Katy, TX (US); Ernest D. Hollas, Weimar, TX (US)

(73) Assignee: C-Cure Corp., Katy, TX (US)

( * ) Notice: Subject to any disclaimer, the term of this patent is extended or adjusted under 35 U.S.C. 154(b) by 120 days.

(21) Appl. No.: 10/105,718

(22) Filed: Mar. 25, 2002

(65) Prior Publication Data

US 2002/0144632 A1 Oct. 10, 2002

Related U.S. Application Data

(63) Continuation-in-part of application No. 09/716,399, filed on Nov. 20, 2000.

(51) Int. Cl.$^7$ ............................................... C04B 14/00
(52) U.S. Cl. ...................................... 106/712; 106/733
(58) Field of Search ................................. 106/712, 733

(56) References Cited

U.S. PATENT DOCUMENTS

| | | |
|---|---|---|
| 1,195,140 A | 8/1916 | Keck |
| 1,910,419 A | 5/1933 | Amon |
| 3,068,109 A | 12/1962 | Rodeffer |
| 3,117,882 A | 1/1964 | Herschler et al. |
| 3,592,679 A | 7/1971 | Tully et al. |
| 3,650,786 A | 3/1972 | Maravilla |
| 3,667,976 A | 6/1972 | Tanner |
| 3,670,785 A | 6/1972 | Heiss et al. |
| 4,020,040 A | 4/1977 | Kattoh et al. |
| 4,026,716 A | 5/1977 | Urschel, III et al. |
| 4,204,876 A | 5/1980 | Bowden |
| 4,207,175 A | 6/1980 | Moudgil |
| 4,247,339 A | 1/1981 | Bolton et al. |
| 4,335,065 A | 6/1982 | Ando |
| 4,443,567 A | 4/1984 | Sternisa et al. |
| 4,495,228 A | 1/1985 | Cornwell |
| 4,597,997 A | 7/1986 | Weill |
| 4,661,164 A | 4/1987 | Severinghaus, Jr. |
| 4,668,560 A | 5/1987 | Kobayashi et al. |
| 4,717,016 A | 1/1988 | Dalgleish |
| 4,741,781 A | 5/1988 | De Witte |
| 4,792,236 A | 12/1988 | Heinis et al. |
| 4,813,000 A | 3/1989 | Wyman et al. |
| 4,859,504 A | 8/1989 | Rossiter et al. |
| 4,911,642 A | 3/1990 | Knowles |
| 4,946,505 A | 8/1990 | Jungk |
| 5,120,367 A | 6/1992 | Smith et al. |
| 5,199,986 A | 4/1993 | Kröckert et al. |
| 5,215,584 A | 6/1993 | Buxbaum et al. |
| 5,224,595 A | 7/1993 | Sugimoto et al. |
| 5,288,160 A | 2/1994 | Li et al. |
| 5,314,536 A | 5/1994 | Kawasaki |
| 5,362,322 A | 11/1994 | Johansen, Jr. et al. |
| 5,416,150 A | 5/1995 | Boeck |
| 5,558,708 A | 9/1996 | Johansen, Jr. et al. |
| 5,853,476 A | 12/1998 | Will |
| 5,890,907 A | 4/1999 | Minasian |
| 5,951,752 A | 9/1999 | Johansen, Jr. et al. |

FOREIGN PATENT DOCUMENTS

| | | |
|---|---|---|
| CN | 1216311 A | 5/1999 |
| DE | 37 09 909 A1 | 11/1989 |
| EP | 0 445 653 A1 | 9/1991 |
| EP | 0 460 744 A1 | 12/1991 |
| GB | 1078723 | 9/1967 |
| GB | 2065692 | 7/1981 |
| GB | 2085463 | 4/1982 |
| GB | 2183626 | 6/1987 |
| JP | 52082923 A2 | 7/1977 |
| JP | 60251162 A2 | 12/1985 |
| JP | 61040861 A2 | 2/1986 |
| JP | 63206343 A2 | 8/1988 |
| JP | 03218990 A2 | 9/1991 |
| JP | 04285045 A2 | 10/1992 |
| JP | 09316371 A2 | 12/1997 |
| WO | WO 92/12102 | 7/1992 |

OTHER PUBLICATIONS

C–Cure Product Brochure for Colorcure 945, Grout Mixture (1993).
Materials and Methods Standards Association Bulletin No. 9, Mar. 15, 1994.
Ceramic Tile Institute, "Field Reports", Chapter 11 (no date).
National Tile Contractor's Association, Inc., Inconsistent Grout Color Chart (no date).
Abstract of Japanese Patent Application JP 58055356 Apr. 1983.
Abstract of French Patent 2,661,684 Nov. 1991.
www.thirdcoastimports.com, Calicum Carbonate, MW 60/40, HyMag—94., (1994).
3M™ Colorquartz™ Aggregate For Swimming Pools Brochure (1999).
Inst. Chem. Metall., Acad. Sin., Beijing, People of Republic of China, Zhao et al., Haugong Yejin (1989), 10(3)m 59–63.

*Primary Examiner*—Paul Marcantoni
(74) *Attorney, Agent, or Firm*—Hedman & Costigan, P.C.

(57) ABSTRACT

A composition and method for preparing colored cement for use as mortars, grouts, stuccos or pool plasters that employs a pigmented inert filler.

31 Claims, No Drawings

COLORED CEMENT

This application in a continuation of U.S. Ser. No. 09/716,399 filed on Nov. 20, 2000.

BACKGROUND OF THE INVENTION

This invention relates to a composition and a method for preparing colored cement for use as mortars (such as thin set mortars and brick mortars), grouts, stuccos or pool plasters. More specifically, the invention relates to a cement composition comprising cement, water and inert filler wherein the inert filler comprises an effective amount of an inert filler that has been coated with a pigmented composition or dye. The pigment or dye coating must be permanently bonded to the inert filler or impart a superhydrophobic property to the inert filler. When the pigment or dye coating is permanently bonded to the inert filler it is preferred that the pigment or dye coating be chemically bonded to the inert filler such as by means of an epoxy or siloxane linkage. The application of the pigment or dye coating should be conducted at temperatures below 600° F., preferably below 500° F. When the pigment or dye coating imparts a superhydrophobic property to the inert filler, the coating should comprise submicron silica particles that have been treated for water repellency. Examples of superhydrophobic coatings are described in U.S. Pat. Nos. 5,890,907 and 3,592,679 that are incorporated herein by reference. The present invention also has the surprising benefit of being a safe and non-carcinogenic cement composition.

The addition of pigments or dyes to cement compositions is well known in the art. For example, U.S. Pat. No. 4,204,876 teaches a pigment containing thixotropic slurry that can be stored in drums for 6–12 months by a cement contractor and used in a batching system. Similarly U.S. Pat. Nos. 5,558,708 and 5,846,315 disclose a method, composition and system for preparing pigmented cement compositions employing an aqueous component that contains a pigment and a dry powdered component. Other methods for preparing colored or pigmented cement compositions are described in, U.S. Pat. Nos. 5,199,986, 3,667,976, 4,946,505, United Kingdom Patent No. 2,183,626, German Patent No. 3,709,909 and WO 92/12102 which are incorporated herein by reference.

The 3M company also sells a product known as COLORQUARTZ™ aggregate which consists of quartz particles that are ceramically coated by a process which permanently bonds inorganic pigments to the quartz particle. It is believed that these particles are prepared by firing, i.e. intense heating, at tempatures above 600° F. The particles are available in an S grade, which are spherical shaped particles and a T grade which are trowable particles. These ceramically coated quartz particles have a large particle size, typically around 12–70 mesh or larger. The ceramically coated granules can be added to cement compositions such as pool plasters or flooring compositions to provide specks of color throughout the pool or flooring. The ceramically coated granules are very expensive and fail to provide a uniform color to the cement composition.

Attempts have also been made to prepare a gray cement composition by employing a naturally occurring gray calcium carbonate product as an inert filler. These attempts have not proved acceptable because the naturally occurring gray calcium carbonate exhibits a very high sulfur content that may adversely affects the final properties of the cured product. Other attempts at preparing colored cement compositions have included crushing naturally occurring colored marble, such as a green marble, and using the crushed colored marble as the inert filler in the cement composition. This process is quite expensive, the colors and hues are limited and additional pigment may be required.

With the exception of the naturally occurring gray calcium carbonate and the crushed colored marble, all the aforementioned prior methods for preparing colored cement require the user to modify the well established methods for preparing cement compositions by either changing the components used in the composition or requiring the addition of extra components such as pigments. These changes often increase the expense and time required for a project and are meet with great resistance by the industry. The use of naturally occurring colored marble will added greatly to the expense of any project due to the shipping and handling costs associated with locating the marble and shipping the marble from the quarry to a job site which is often hundreds if not thousands of miles away from the quarry.

A further disadvantage of the prior methods for preparing colored cement is that the pigment used to prepare the colored cement is typically dispersed throughout the composition rather than attached to any of the main components in the composition. The mere dispersion of the pigment allows it to be easily leached while the cement is hydrating. In addition, the dispersion of pigments in cement compositions often resulted in color differences between batches due to variations in the mixing procedure, gauging water variation, or inaccurate weighing of the pigment. A further disadvantage of the free pigment in the system is that during application of the cement, the pigment tends to float to the surface of the cement composition, causing a non-uniform appearance.

A further disadvantage of the prior methods for making colored cement and non-colored cement is the employment of sand. It has recently been reported that raw, uncoated sand presents a health risk to humans. The primary health risk is from the inhalation of respirable silica dust that can cause silicosis. Silicosis is a pulmonary fibrosis, i.e. causes the development of scar tissue in lungs, which can be progressive and disabling to the point of causing death.

The International Agency for Research on Cancer (IRAC) has categorized sand as a Class 2A carcinogen. A Class 2A carcinogen is one in which there is limited evidence for carcinogenicity in humans and sufficient evidence for carcinogenicity in experimental animals.

Due to the health risks associated with the use of sand in cement compositions, it is an object of the present invention to provide a cement composition that significantly reduces the carcinogenic risk.

It is also an object of the present invention to provide a composition and method for preparing colored cement that does not substantially increase the cost of a cement composition.

It is a further object of the present invention to provide a composition and method for preparing colored cement that can be easily incorporated into existing methods of manufacturing.

It is an additional object of the present invention to provide a composition and method for preparing colored cement that can provide a final cured cement product that exhibits a more uniform and permanent color that is UV stable and chemically resistant.

It is a further object of the present invention to provide a composition that reduces unwanted efflorescence in pool plasters and increases stain resistance.

It is still a further object of the present invention to provide a method of preparing colored cement that prevents the cement workers from breathing and contacting free pigments that often contain toxic heavy metals.

SUMMARY OF THE INVENTION

These and other objects of the present invention are achieved by a composition comprising cement, water and inert filler wherein the inert filler comprises an effective amount of an inert filler that has been pigmented by dying the inert filler, chemically bonding a pigment to the inert filler or permanently coating a pigment onto the inert filler. In a preferred embodiment of the present invention the inert filler comprises colored aggregate, sand, calcium carbonate or any other inert object. An especially preferred pigmented inert filler is a commercial product known DEK ROK surface aggregates, available from Clifford W. Estes Co. of Lyndhurst, N.J. The DEK ROK product is believed to comprise sand, the grains of which are coated with much finer submicron particles that have been surface treated for water repellency as taught in U.S. Pat. No. 3,592,679. The submicron silica powders are available commercially under the trade name CABOSIL from the Cabot Corp. of Boston, Mass. Such fine silica powders, surface treated with hexamethyldisilizane are commercially available under the tradename Tullannox from Tulco Corp. of Ayer, Mass. Another preferred pigmented inert filler is commercially available from Sandtastik, Inc. of Niagra Falls, N.Y., under the trade name SANDTASTIK. It is believed that the SANDTASTIK product comprises sand wherein the pigment has been chemically bonded to the sand.

The effective amount and size of the pigmented inert filler will vary depending upon the color that is desired for the final product and the application. Typically the effective amount of the pigmented inert filler will range from 5–100 weight percent, preferably 15–100 weight percent and most preferably 25–100 weight percent based on the total weight of the inert filler employed in the particular application. To obtain the non-carcinogenic properties of the present invention, the pigmented inert filler will comprise 100 weight percent of the inert filler. Use of 100 weight percent of pigment inert filler is especially preferred.

The composition may further comprise conventional additives that are commonly known in the industry such as latexes, liquefiers, reinforcing fibers, preservatives, antifoaming agents, setting aids, viscosity control agents, plasticizers, anti-slumping agents, moisture retaining additives or mixtures of the foregoing.

In a preferred embodiment, the composition comprises about 5 to about 70 weight percent, most preferably about 10 to about 55 weight percent, of cement; about 5 to about 65 weight percent, most preferably about 10 to about 50 weight percent, of an inert filler which includes the pigmented inert filler; about 10 to 40 weight percent, most preferably about 15 to 30 weight percent water and 0 to about 5 weight percent, preferably 0 to about 2 weight percent of non-bonded pigment. In a preferred embodiment, no free or non-bonded pigment is needed to create a cement composition with a uniform color because the pigmented inert filler contains a small amount of fines as will be discussed below. All the foregoing weight percents are based on the total weight of the composition.

The present invention also comprises a method for preparing a colored cement composition that comprises mixing the pigmented inert filler with water, cement and 0 to about 5 weight percent, preferably 0 to about 2 weight percent, of free or non-bonded pigment to prepare a colored cement composition.

DETAILED DESCRIPTION OF THE INVENTION

The cement employed in the present invention is preferably Type I white, Type I gray or Type II gray Portland cement but other types of Portland cement and/or other types of cements such as aluminous cement, Type III high early strength cement, Portland blast furnace slag cement or Portland pozzolan cement may also be used.

Inert fillers that may be used in the present invention comprise aggregate filler, fine filler or a combination of aggregate and fine fillers. The inert filler additive may be silica sand, limestone, perlite, volcanic aggregate, alumina trihydrate, ground quartz, volcanic ash, fine sand, talc, mica, clays, calcium carbonate (marble dust) or other clean inert material or mixtures of the foregoing. The inert filler of the cement component may comprise one, or a combination of the above-identified clean inert materials. Any of the above-described inert filler materials may by dyed, bonded or coated with a pigmented material to form the pigmented inert filler for use in the present invention.

The attaching, i.e. dying, bonding or coating, of a pigment, onto an inert filler can be accomplished by any means commonly known in the chemical industry, however the process chosen should result in a pigmented inert filler where the pigment will not be released or dissolved in an aqueous media or an aqueous environment such as a swimming pool. The pigmented inert filler should also withstand normal day to day cleaning with conventional household cleaning compounds used in accordance the manufacturer's specifications. The process of attaching the pigment to the inert filler should occur at temperatures less than 600° F., preferably below 500° F. The pigmented inert filler should be prepared prior to its incorporation into the cement composition and most preferably prior to its sale for incorporation into a cement composition or delivery to a job site. A preferred method for preparing the pigmented inert filler is the method employed by Clifford W. Estes Co., of Lyndhurst, N.J. to produce its superhydrophobic product sold under the trade names ULTRASTONE, WILMAR SPECTRASTONE, PERMA COLOR SURFACE AGGREGATE, MAGIC SAND and DEC ROC products. Another preferred pigmented product is commercially available from Sandtastik, Inc. of Niagra Falls, N.Y. under the trade name SANDTASTIK. Still another preferred pigmented product is a commercial product known as "SCENIC SANDS" available from Activa Products, Inc., of Marshall, Tex. USA. It is believed that the process employed by Activa Products to manufacture the colored sand involves the spraying of a water based pigment composition onto sand or other inert particles such as calcium carbonate and heating, but not ceramically firing, the sprayed particles to remove the water. Once the water is removed, the pigment composition is permanently bonded to the sand. Applicant has attempted to coated calcium carbonate with the pigment composition and process employed by Activa to prepare the SCENIC SANDS product. The coating of the calcium carbonate was not successful for the present invention because the coating quickly washed off the calcium carbonate when the coated calcium carbonate was placed in water.

When sand is used as the inert filler and the reduced carcinogenic properties of the present invention are desired, all of the sand used in the composition should be sand that has been coated with a pigment composition. A preferred coated sand is obtained by the process used by Clifford W. Estes Co. to produce its ULTRASTONE, WILMAR SPECTRASTONE, PERMA COLOR SURFACE AGGREGATE, MAGIC SAND and DEC ROC products. The use of coated sand reduces the development of respirable silica dust that could be inhaled and lead to silicosis, thereby rendering the cement composition significantly less carcinogenic.

The inert filler should have a particle size between 1 and 350 mesh. The actual range of particle sizes will depend upon the particular application for the composition. In order to obtain a cement composition with a uniform color, the pigmented inert filler should comprise a range of particle sizes. More specifically, the pigmented inert filler should contain at least about 5 weight percent, preferably at least about 10 weight percent, of the pigmented inert filler fines (particles that are smaller than 100 mesh, preferable smaller than 150 mesh and most preferably particles smaller than 200 mesh). The amount and size of pigmented inert filler fines will depend upon the particular application for the cement composition. For example, if the colored cement composition will be used as a grout, the particle size of the inert filler (pigmented and non-pigmented inert filler) should be between 40 and 100 mesh with 0–10 weight percent comprising pigmented inert filler fines (preferably smaller than 200 mesh). In the case of sanded grout, it is preferred that a large portion, i.e., 70–95% of the inert filler have a particle size between 45 and 60 mesh with 0–10 weight percent comprising pigmented inert filler fines while for non-sanded grout it is preferred that a large portion of the inert filler have a particle size between 200 and 325 mesh. If the colored cement composition will be used as a mortar, the particle size of the inert filler should be between 4 and 100 mesh with 0–10% comprising pigmented inert filler fines. If the colored cement composition will be used as a stucco, the particle size of the inert filler should be between 30 and 120 mesh with 0–10% comprising pigmented inert filler fines. If the colored cement composition is a floor surfacing or floor leveling composition, the particle size of the inert filler should be between 20 and 180 mesh with 0–10% comprising pigmented inert filler fines and if the colored cement composition will be used as a pool plaster, the particle size of the inert filler should be between 4 and 325 mesh with 0–10% comprising pigmented inert filler fines.

The dye or pigment used to prepare the pigmented inert filler for use in the present invention can be any type of dye or pigment that is commercially available from companies such as Bayer Chemicals or Davis Pigments, Inc. The amount of free or non-bonded dye or pigment is preferably zero weight percent based on the total weight of the composition, however, if the inert filler does not contain a sufficient quantity of pigmented inert filler fines, a small amount of free or non-bonded pigment may be added to the composition. The quantity of pigmented inert filler fines (particles smaller than 100 mesh, preferably smaller than 150 mesh and most preferably smaller than 200 mesh) should be about 1 to 10 weight percent of the the total amount of inert filler (pigmented inert filler and non-pigmented inert filler), preferably 2 to 7 weight percent of the total amount of inert filler. The amount of fines required to prepare a cement product with a uniform color will depend upon the actual application for the cement composition, i.e grout or pool plaster, and the size of the fines.

Due to the preparation of the pigmented inert filler prior to its sale or shipment to a job site, the applicator or mechanic will be able to practice the present invention without modifying his or her established practice of preparing cement compositions. More importantly, because the pigmented inert filler is prepared prior to its sale or shipment to a job site, the present invention eliminates the potential for dyes or pigments being spilled at the job site or during storage and shipping thereby decreasing the expense caused by loss of materials and time spent cleaning the spill.

To practice the present invention, the applicator or mechanic simply mixes cement, water and pigmented inert filler in a conventional mixer in ratios that have traditionally been used in the industry. If free or non-bonded pigment is necessary it is preferred that the free or non-bonded pigment be added to the pigmented inert filler prior to shipment of the pigmented inert filler to the job site.

Other conventional additives that may also be employed in the present invention to enhance the physical properties of the composition are latexes, setting aids, dispersants, surfactants, liquefiers, reinforcing fibers, preservatives, antifoaming agents, thixotropy and viscosity control agents and plasticizers. Some other miscellaneous additives that may be used are ethylene glycol, propylene glycol, neopentyl glycol, vermiculite, sodium stearate and hydroxides. These miscellaneous additives are used to improve freeze thaw stability, accelerate setting, prevent shrinkage, efflorescence or sagging, flame retardancy or hydrophobic properties of the final cement product. These property enhancing additives are present in amounts commonly known in the industry and are more fully described in applicants co-pending U.S. Pat. No. 5,951,752 which is incorporated by reference.

The color of the cement composition prepared according to the foregoing method will depend upon the color that is reacted with the inert filler. A wider range of colors can be obtained by combining predetermined amounts of two or more differently pigmented inert fillers. For example, 300 lbs of a blue calcium carbonate combined with 300 lbs of a gray calcium carbonate are mixed with 376 lbs of white portland cement and 60 lbs of water to obtain a dark blue colored cement composition. This method of combining two or more differently pigmented inert fillers would preferably employ a combination chart or grid such as the one described in U.S. Pat. No. 5,362,322, which is incorporated herein by reference. An additional method for preparing a colored cement composition that is in accordance with the present invention, comprises the following steps: (i) selecting a color from a color grid having axes with preselected component colors; (ii) determining the component colors from the axes of the grid corresponding to the selected color; (iii) mixing two or more predetermined portions of pigmented inert fillers that correspond to the component colors from the axis of the grid to produce a selected pigmented inert filler component that corresponds to the determined color (i) selected from the grid; and (iv) the mixing of the selected pigmented inert filler component (iii) with water and cement to obtain a cement composition with the selected color.

The present invention also relates to a method for preparing colored cement compositions such as mortars and grouts which comprises mixing a predetermined amount of water with a predetermined and prepackaged amount of a dry component comprising cement, pigmented inert filler, optionally non-pigmented inert filler, optionally non-bonded or free pigment, and optionally conventional additives. The dry component can be packaged in suitable containers such a 5, 10, 25, 50, 80 or 100 lbs bags. Other suitable packaging can also be used such a 55 gallon drums or conventional bulk packaging. These packages of the dry component can be transported to a job site where the contents are placed into a mixing vessel such as a bucket or conventional cement mixer and a standarized amount of water is then added to the mixing vessel. The water and dry component are then mixed to produce a colored cement composition in accordance with the present invention. One of the advantages of this method of preparing colored cement is that if additional mortar or grout is need to complete a job, a second or additional package of the dry component can be mixed with a second or additional standardized amounts of water, to obtain a second or additional batch of colored cement that will have a color consistent with the first batch of colored cement.

DETAILED DESCRIPTION OF A PREFERRED EMBODIMENT

The present invention will be described in detail by reference to the following examples that are provided for illustrative purposes. The following examples should not be construed as limiting the invention. Many variations that do not depart from the spirit or scope of the present invention will suggest themselves to those skilled in the art. All such obvious modifications are within the intended scope of the invention.

EXAMPLE 1

A pool plaster composition with a uniform blue color is prepared in accordance with the present invention by adding 94 parts by weight of white Portland cement, 140 parts by weight of a dark blue superhydrophobic sand from Clifford W. Estes Co., a conventional troweling aid commonly known in the industry, such as E-Z SPREAD and 47 parts by weight of water to a conventional cement mixer and mixing until a uniform consistency is obtained. The particle size of the superhydrophobic sand ranges from 4 to 325 mesh with the average particle size of 6 and up to 20 percent fines that have a particle size of 200 mesh or smaller. Up to 1 weight percent based on the total weight of the pool plaster composition of a polyvinyl alcohol may also be added to the composition to improve the physical properties of the composition if desired.

EXAMPLE 2

A pool plaster composition with a uniform light blue color is prepared in accordance with the present invention by adding 94 parts by weight of white Portland cement, 70 parts by weight of a dark blue superhydrophobic sand from Clifford W. Estes Co., 70 parts by weight of a conventional white calcium carbonate pool aggregate, a conventional troweling aid commonly known in the industry and 47 parts by weight of water to a conventional cement mixer and mixing until a uniform consistency is obtained. The particle size of the superhydrophobic sand ranges from 4 to 325 mesh with the average particle size of 60 and up to 20 percent fines that have a particle size of 200 mesh or smaller. The particle size of the calcium carbonate ranges from 4 to 325 mesh with the average particle size of 60 and up to 20 percent fines that have a particle size of 200 mesh or smaller. Up to 1 weight percent based on the total weight of the pool plaster composition of a polyvinyl alcohol may also be added to the composition to improve the physical properties of the composition if desired.

EXAMPLE 3

A ceramic tile grout composition with a uniform earth tone color is prepared in accordance with the present invention by adding 30–35 parts by weight of white Portland cement, 60–65 parts by weight of an earth tone superhydrophobic sand from Clifford W. Estes Co., 0–3 part by weight of a free or non-bonded pigment, 1–5 parts by weight of conventional processing aids and 20 parts by weight of water to a conventional mixer and mixing until a uniform consistency is obtained. The particle size of the superhydrophobic sand ranges from 60–100 mesh and contains approximately 0–5 weight percent fines (particles with a mesh size of 200 or smaller). The more fines present, the less free or non-bonded pigment that is needed for the grout composition.

In order to evaluate the "permanence" of the dye or pigment bonded to the inert filler, applicants have subjected a number of dyed and pigmented sands to acidic and bleaching. The tests were conducted by immersing 100 grams of pigmented sand in 400 ml of hydrochloric acid (HCl) solutions or sodium hypochlorite (NaOCl) solutions for 48 hours. The temperature of the test solutions was maintained at 100° F. and the sand was not stirred or agitated. After 48 hours, the sand is removed from the test solution, washed with pure water and air dried. The color of the immersed sand is then compared to a sample of the original sand. The results of the tests are reported in Table 1 below:

TABLE 1

| Test Solution | ESTES | SANDTASTIK | SCENIC SANDS* |
|---|---|---|---|
| HCl (20 degrees Baume) | 10 | 6 | 10 |
| HCl (10 degrees Baume) | 10 | 6 | 10 |
| HCl (5 degrees Baume) | 10 | 6 | 10 |
| NaOCl (6%) | 10 | 6 | 10 |
| NaOCl (3%) | 10 | 8 | 10 |
| NaOCl (1.5%) | 10 | 9 | 10 |

(The color of the Estes, Sandastik and Scenic Sand products tested was teal. A black Scenic Sand product was also tested which gave results similiar to that reported above. solutions.)

The numbers in the above table are based upon a scale of 1–10, wherein 1 is total color loss and 10 is no color loss.

As demonstrated by the data in Table 1, the pigmented inert filler that is used in the present invention should retain at least 60%, preferably 80% and most preferably 100% of its color after being immersed for 48 hours in concentrated hydrochloric acid and after being immersed for 48 hours in a 6% sodium hypochlorite solution.

We claim:

1. A cement composition comprising:
   i) cement;
   ii) water;
   iii) inert filler comprising 5–100 weight percent of a pigmented inert filler wherein the pigmented inert filler maintains at least 60% of its color after being immersed in concentrated hydrochloric acid for forty-eight hours and at least 60% of its color after being immersed in a 6 percent sodium hypochlorite solution for forty-eight hours; and
   iv) optionally conventional additives selected from the group consisting of latexes, setting aids, dispersant, surfactants, liquefiers, reinforcing fibers, preservatives, antifoaming agents, thixotropy and viscosity control agents, plasticizer, freeze thaw stabilizers, flame retardancy or mixtures of the foregoing.

2. The cement composition as defined in claim 1 wherein the pigmented inert filler is calcium carbonate.

3. The cement composition as defined in claim 1 wherein the pigmented inert filler is sand.

4. The cement composition as defined in claim 3 wherein the pigmented inert filler is silica sand.

5. The cement composition as defined in claim 1 wherein the composition is a pool plaster, stucco, mortar or grout.

6. The cement composition as defined in claim 1 wherein the effective amount of the pigmented inert filler is approximately 15–100 weight percent of the total weight of the inert filler.

7. The cement composition as defined in claim 6 wherein the effective amount of the pigmented inert filler is approximately 25–100 weight percent of the total weight of the inert filler.

8. The cement composition as defined in claim 7 wherein the effective amount of the pigmented inert filler is approximately 100 weight percent of the total weight of the inert filler.

9. The cement composition as defined in claim 8 wherein pigmented inert filler comprises an inert filler that has exhibits superhydrobic properties or wherein a pigment has been bonded to the inert filler by an epoxy linkage.

10. The cement composition as defined in claim 1 wherein the pigmented inert filler maintains at least 80% of its color after being immersed in concentrated hydrochloric acid for forty-eight hours and at least 80% of its color after being immersed in a 6 percent sodium hypochlorite solution for forty-eight hours.

11. A cement composition consisting essentially of:
 i) cement;
 ii) water;
 iii) inert filler comprising about 100 weight percent of a pigmented inert filler that maintains at least 60% of its color after being immersed in concentrated hydrochloric acid for forty-eight hours and at least 60% of its color after being immersed in a 6 percent sodium hypochlorite solution for forty-eight hours and
 iv) optionally conventional additives selected from the group consisting of latexes, setting aids, dispersant, surfactants, liquefiers, reinforcing fibers, preservatives, antifoaming agents, thixotropy and viscosity control agents, plasticizer, freeze thaw stabilizers, flame retardancy or mixtures of the foregoing.

12. A method for preparing a colored cement composition comprising the step of (a) preparing a pigmented inert filler wherein the pigmented inert filler maintains at least 60% of its color after being immersed in concentrated hydrochloric acid for forty-eight hours and at least 60% of its color after being immersed in a 6 percent sodium hypochlorite solution for forty-eight hours and (b) mixing water cement, inert filler wherein the inert filler comprises 5–100 weight percent based on the total weight of the inert filler of the pigmented inert filler prepared in step (a) and optionally conventional additives selected from the group consisting of latexes, setting aids, dispersant, surfactants, liquefiers, reinforcing fibers, preservatives, antifoaming agents, thixotropy and viscosity control agents, plasticizer, freeze thaw stabilizers, flame retardancy or mixtures of the foregoing.

13. The method as defined in claim 12 wherein the effective amount of the pigmented inert filler is approximately 15–100 weight percent of the total weight of the inert filler.

14. The method as defined in claim 12 wherein the effective amount of the pigmented inert filler is approximately 25–100 weight percent of the total weight of the inert filler.

15. The method as defined in claim 12 wherein the effective amount of the pigmented inert is about 100 weight percent of the total weight of the inert filler.

16. The method as defined in claim 12 wherein the pigmented inert filler comprises an inert filler that has exhibits superhydrobic properties or wherein a pigment has been bonded to the inert filler by an epoxy or a siloxane linkage.

17. The method as defined in claim 12 wherein the pigmented inert filler maintains at least 80% of its color after being immersed in concentrated hydrochloric acid for forty-eight hours and at least 80% of its color after being immersed in a 6 percent sodium hypochlorite solution for forty-eight hours.

18. A method for preparing a colored cement composition comprising:
 (i) selecting a color from a color grid having axes with preselected component colors;
 (ii) determining the component colors from the axes of the grid corresponding to the selected color;
 (iii) mixing two or more predetermined portions of a pigmented inert filler that corresponds to the determined component colors selected from the axis of the grid color wherein the pigmented inert filler maintains at least 60% of its color after being immersed in concentrated hydrochloric acid for forty-eight hours and at least 60% of its color after being immersed in a 6 percent sodium hypochlorite solution for forty-eight hours; and
 (iv) during the mixing of the pigmented inert fillers or after the mixing of the pigmented inert fillers, mixing water and cement with the pigmented inert fillers in a mixing container to obtain a cement composition with the selected color.

19. The composition as defined claim 1 further comprising 0 to 5 weight percent based on the total weight of the composition of non-bonded pigment.

20. The composition as defined in claim 1 wherein the inert filler comprises 0–10 weight percent based on the total weight of the inert filler, of pigmented inert filler fines with a particle size of smaller than 100 mesh.

21. The composition as defined in claim 1 wherein the inert filler comprises 0–10 weight percent based on the total weight of the inert filler, of pigmented inert filler fines with a particle size of smaller than 150 mesh.

22. The composition as defined in claim 1 wherein the inert filler comprises 0–10 weight percent based on the total weight of the inert filler, of pigmented inert filler fines with a particle size of smaller than 200 mesh.

23. The composition as defined in claim 1 wherein the particle size of the inert filler is between 40 and 100 mesh.

24. The composition as defined in claim 1 wherein the particle size of the inert filler is between 4 and 325 mesh.

25. The cement composition as defined in claim 11 wherein pigmented inert filler comprises an inert filler that has exhibits superhydrobic properties or wherein a pigment has been bonded to the inert filler by an epoxy linkage.

26. The cement composition as defined in claim 11 wherein the pigmented inert filler maintains at least 80% of its color after being immersed in concentrated hydrochloricacid for forty-eight hours and at least 80% of its color after being immersed in a 6 percent sodium hypochlorite solution for forty-eight hours.

27. The composition as defined in claim 11 wherein the inert filler comprises 0–10 weight percent based on the total weight of the inert filler, of pigmented inert filler fines with a particle size of smaller than 100 mesh.

28. The composition as defined in claim 11 wherein the inert filler comprises 0–10 weight percent based on the total weight of the inert filler, of pigmented inert filler fines with a particle size of smaller than 150 mesh.

29. The composition as defined in claim 11 wherein the inert filler comprises 0–10 weight percent based on the total weight of the inert filler, of pigmented inert filler fines with a particle size of smaller than 200 mesh.

30. The composition as defined in claim 11 wherein the particle size of the inert filler is between 40 and 100 mesh.

31. The composition as defined in claim 11 wherein the particle size of the inert filler is between 4 and 325 mesh.

* * * * *